United States Patent
Ni

(10) Patent No.: US 9,967,108 B2
(45) Date of Patent: May 8, 2018

(54) CONNECTION SETTING SYSTEM AND A METHOD THEREOF

(71) Applicant: AIFA TECHNOLOGY CORP., Kaohsiung (TW)

(72) Inventor: Wen-Lu Ni, Kaohsiung (TW)

(73) Assignee: AIFA TECHNOLOGY CORP., New Taipei (TW)

(\*) Notice: Subject to any disclaimer, the term of this patent is extended or adjusted under 35 U.S.C. 154(b) by 0 days. days.

(21) Appl. No.: 15/280,017

(22) Filed: Sep. 29, 2016

(65) Prior Publication Data

US 2017/0111940 A1    Apr. 20, 2017

(30) Foreign Application Priority Data

Sep. 30, 2015   (TW) .............................. 104132136 A

(51) Int. Cl.
*H04W 12/08*  (2009.01)
*H04L 12/28*  (2006.01)
*H04L 29/08*  (2006.01)
*H04L 12/64*  (2006.01)
*H04L 29/06*  (2006.01)

(52) U.S. Cl.
CPC ...... *H04L 12/2825* (2013.01); *H04L 12/6418* (2013.01); *H04L 67/141* (2013.01); *H04W 76/11* (2018.02); *H04L 67/42* (2013.01)

(58) Field of Classification Search
CPC ........ H04W 12/08; H04W 12/00; G06K 9/00; G06K 9/00765
See application file for complete search history.

(56) References Cited

U.S. PATENT DOCUMENTS

| 7,630,576 B2 * | 12/2009 | Kondo ...................... G06T 3/40 382/276 |
| 9,600,726 B2 * | 3/2017 | Kirkby ............... G06K 9/00711 |
| 2017/0195313 A1 * | 7/2017 | Kirkby .................. H04L 63/083 |

FOREIGN PATENT DOCUMENTS

| JP | 2002142271 A | 5/2002 |
| JP | 2002354557 A | 12/2002 |
| JP | 2003319471 A | 11/2003 |
| JP | 2015076822 A | 4/2015 |

\* cited by examiner

*Primary Examiner* — Blane Jackson

(57) ABSTRACT

A system connection setting device, for setting a connection between a household appliance and a mobile device connected to an Internet, comprises a wireless communication unit mounted and electrically connected to the household appliance and having a unique identity data, a communication unit connected to a server via the Internet and a remote controller for sending a wireless input signal. The wireless communication unit responds to the wireless input signal, establishes a connection with the communication unit and transmits the unique identity data to the communication unit, so that the communication unit transmits the unique identity data to the server, and the server stores the unique identity data and an identity code corresponded to the mobile device uniquely as a pairing information related to the wireless communication unit and the mobile device. The present invention further provides a connection setting method implemented via the connection setting device.

13 Claims, 4 Drawing Sheets

CONNECTION SETTING SYSTEM AND A METHOD THEREOF

BACKGROUND OF THE INVENTION

1. Field of the Invention

The present invention relates to a connection setting device and a method thereof, and more particularly, to a connection setting device and a method for setting a connection between a household appliance and a mobile device.

2. Description of the Prior Art

Most of the existing household electrical appliances have corresponding infrared remote controllers for users to remotely control the home appliances within a certain range conveniently, but the arising problem is that the infrared remote controller can only be operated within a limited range of remote controls, especially when the user is outside, the user can not remotely control the home appliances in the house. To solve the above-mentioned problem, the following provides a kind of conventional remote control system that can remotely control the home appliances in the house in a long-distance remote control mode.

Please refer to FIG. 1, the conventional remote control system comprises a WiFi module 14 electrically connected to a household appliance 11, a communication unit 15 connected to an Internet 12 and the WiFi module 14, a server 16 connected to the Internet 12 and a mobile device 13 connected to the Internet 12. Before using the remote control system, a user must use a terminal (the terminal can also be the mobile device 13) connected to the server 16 via the Internet 12, and a connection setting process (can also be called as a login program) between the household appliance 11 and the mobile device 13 can be completed through executing a application program provided by the server 16. In the connection setting process, the user must manually start the WiFi module 14 and input a unique identity data of the WiFi module 14 and an identity code of the mobile device 13 to the terminal one by one, and the unique identity data and the identity code are transmitted to the server 16 via the terminal. Next, the server 16 stores the unique identity data of the WiFi module 14 and the identity code of the mobile device 13 as a pairing information related to the mobile device 13 and the WiFi module 14. When using the remote control system, the server 16 determines whether to respond to a control request from the Internet 12 according to the stored pairing information, wherein the control request comprises an identity code and a control signal. More specifically, when there is a match between the control request and the pairing information, the server 16 transmits the control signal to the communication unit 15 via the Internet 12, and then the communication unit 15 transmits the control signal to the WiFi module 14 through a WiFi communication. Therefore, the household appliance 11 can execute the corresponding operation according to the control signal received by the WiFi module 14 to achieve the purpose of remote controls.

However, the WiFi module 14 is usually configured on the household appliance 11, such as high-hanging air conditioners or lamps. Under this condition, during the connection setting process, the user often needs to climb up and down to start the WiFi module 14 located at the high position; therefore, it is not only inconvenient but also very dangerous. Besides, when manually inputting the unique identity data, it is likely to have artificial input errors.

Therefore, how to improve the above-mentioned disadvantages became the issue to be further discussed of the present invention.

SUMMARY OF THE INVENTION

Therefore, an object of the present invention is to provide a convenient and fast connection setting device and method.

Therefore, the connection setting device of the present invention is used for setting a connection between a household appliance and a mobile device connected to an Internet, wherein the connection setting device can be operated in one of the two modes, which are a setting mode and a application mode, and the connection setting device comprises a wireless communication unit, a communication unit and a remote controller.

The wireless communication unit is mounted and electrically connected to the household appliance and has a unique identity data. The communication unit is connected to a server via the Internet. The remote controller is used for sending a wireless input signal.

In the setting mode, the wireless communication unit responds to the wireless input signal received from the remote controller and establishes a connection with the communication unit through a short-distance wireless communication for transmitting the unique identity data to the communication unit, so that the communication unit transmits the unique identity data from the wireless communication unit to the server via the Internet, and the server stores the unique identity data from the communication unit and an identity code corresponded to the mobile device uniquely and received via the Internet as a pairing information related to the wireless communication unit and the mobile device.

In the application mode, the communication unit is connected to the wireless communication unit for receiving a control signal of a specific operation sent from the mobile device via the Internet and transmitted via the server and corresponded to the wireless communication unit and related to the household appliance, and transmits the control signal to the wireless communication unit in the way of wireless, so that the household appliance performs the specific operation according to the control signal received by the wireless communication unit.

The connection setting method of the present invention is used for setting a connection between a household appliance and a mobile device connected to an Internet and is implemented via a connection setting device, wherein the connection setting device comprises a wireless communication unit mounted and electrically connected to the household appliance and having a unique identity data, a communication unit connected to a server via the Internet and a remote controller, and the method comprises the following steps:

(A) via the remote controller sending a wireless input signal.

(B) via the wireless communication unit responding to the wireless input signal received from the remote controller, establishing a connection with the communication unit through a short-distance wireless communication and transmitting the unique identity data to the communication unit.

(C) via the communication unit transmitting the unique identity data from the wireless communication unit to the server via the Internet, and the server storing the unique identity data from the communication unit and an identity code corresponded to the mobile device uniquely and received via the Internet as a pairing information related to the wireless communication unit and the mobile device.

The server can determine whether to transmit the control signal to the household appliance via the Internet via the communication unit and the wireless communication unit according to the stored pairing information and a control request of the control signal including the identity code from the mobile device and a specific operation related to the household appliance.

In another embodiment of the present invention, the connection setting device of the present invention can comprise a wireless communication unit and a remote controller. In the setting mode, the wireless communication unit responds to the wireless input signal received from the remote controller and transmits the unique identity data to the mobile device via the Internet, and the mobile device stores the unique identity data and an identity code corresponded to the mobile device uniquely and received via the Internet as a pairing information related to the wireless communication unit and the mobile device. On the other hand, in the application mode, the mobile device sends a control signal of a specific operation corresponded to the wireless communication unit and related to the household appliance and transmits the control signal to the wireless communication unit via the Internet, so that the household appliance performs the specific operation according to the control signal received by the wireless communication unit. Therefore, the communication unit is not necessary because the Internet can be a local area network in a building; by doing so, the object of the present invention can also be achieved without the communication unit in a local area network.

The effect of the present invention is: when in the setting mode, the wireless communication unit establishes the connection with the communication unit automatically according to the wireless input signal sent from the remote controller, and transmits the unique identity data to the server via the communication unit to avoid the conventional technology being inputted with human errors.

The advantages and spirits of the invention may be understood by the following recitations together with the appended drawings.

BRIEF DESCRIPTION OF THE APPENDED DRAWINGS

Some of the embodiments will be described in detail, with reference to the following figures, wherein like designations denote like members, wherein.

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1:
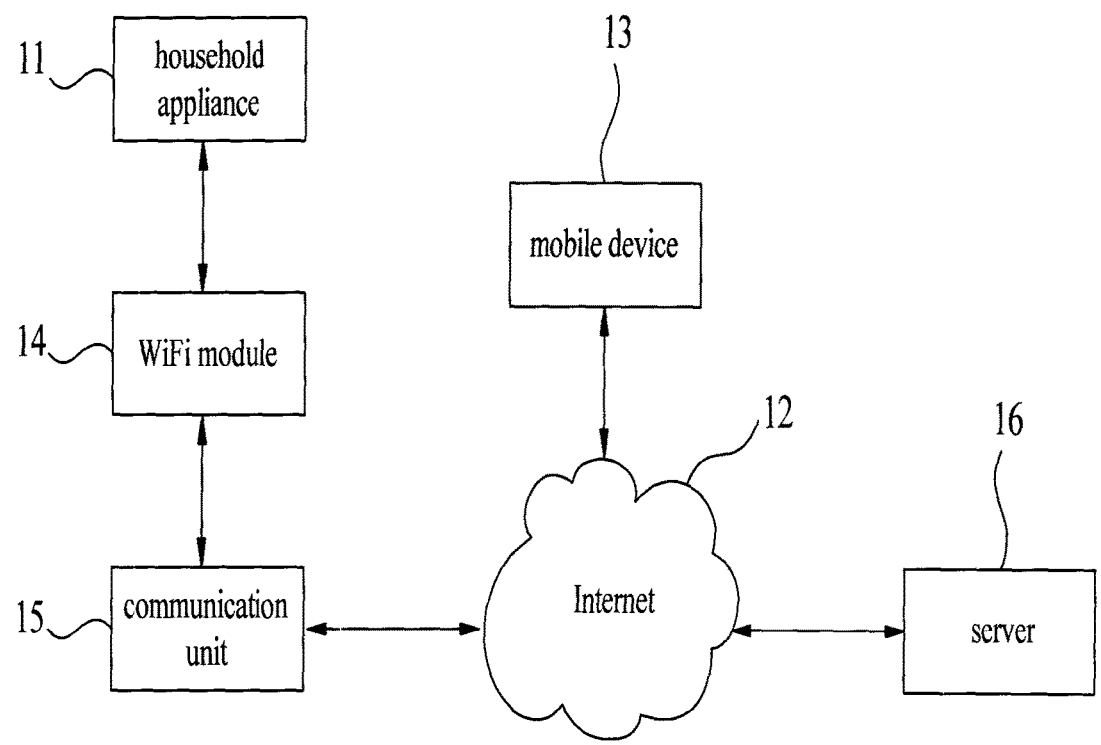
FIG. 1 shows a block diagram of a conventional remote control system.
Figure 2:
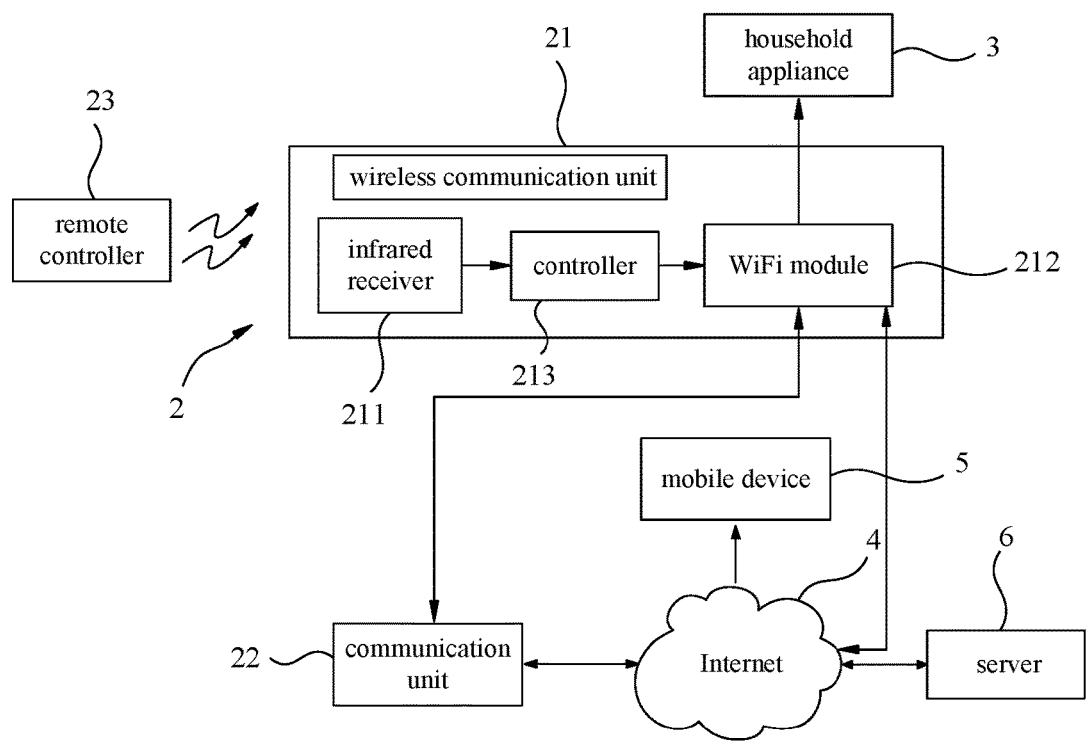
FIG. 2 shows a block diagram of the remote control system of the connection setting device in an embodiment of the present invention.

Please refer to FIG. 2. A connection setting device 2 of the present invention is used to constitute a remote control system for a household appliance 3 with a mobile device 5 connected to an Internet 4 and a server 6 connected to the Internet 4.

The connection setting device 2 is used to set the connection between the household appliance 3 and the mobile device 5, and the connection setting device 2 can be operated in one of the two modes, which are a setting mode and an application mode. The connection setting device 2 comprises a wireless communication unit 21 mounted and electrically connected to the household appliance 3 and having a unique identity data, a communication unit 22 connected to the server 6 via the Internet and a remote controller 23 for sending a wireless input signal. In an embodiment of the present invention, the communication unit 22 can comprise an Access Point (AP). Besides, the remote controller 23 is, but not limited to, an infrared remote controller and the wireless input signal is, but not limited to, an infrared signal.

In the embodiment of the present invention, the wireless communication unit 21 comprises an infrared receiver 211, a WiFi module 212 and a controller 213. The infrared receiver 211 is used for receiving the wireless input signal from the remote controller 23 and turning the wireless input signal into an electrical signal. The WiFi module 212 is electrically connected to the household appliance 3 and has, for example, a generating code as the unique identity data, and the generating code is, for example, an Organizationally Unique Identifier (OUI) applied to Institute of Electrical and Electronics Engineers, Incorporated (IEEE), Registration Authority. The controller 213 is electrically connected to the infrared receiver 211 and the WiFi module 212.

Figure 3:
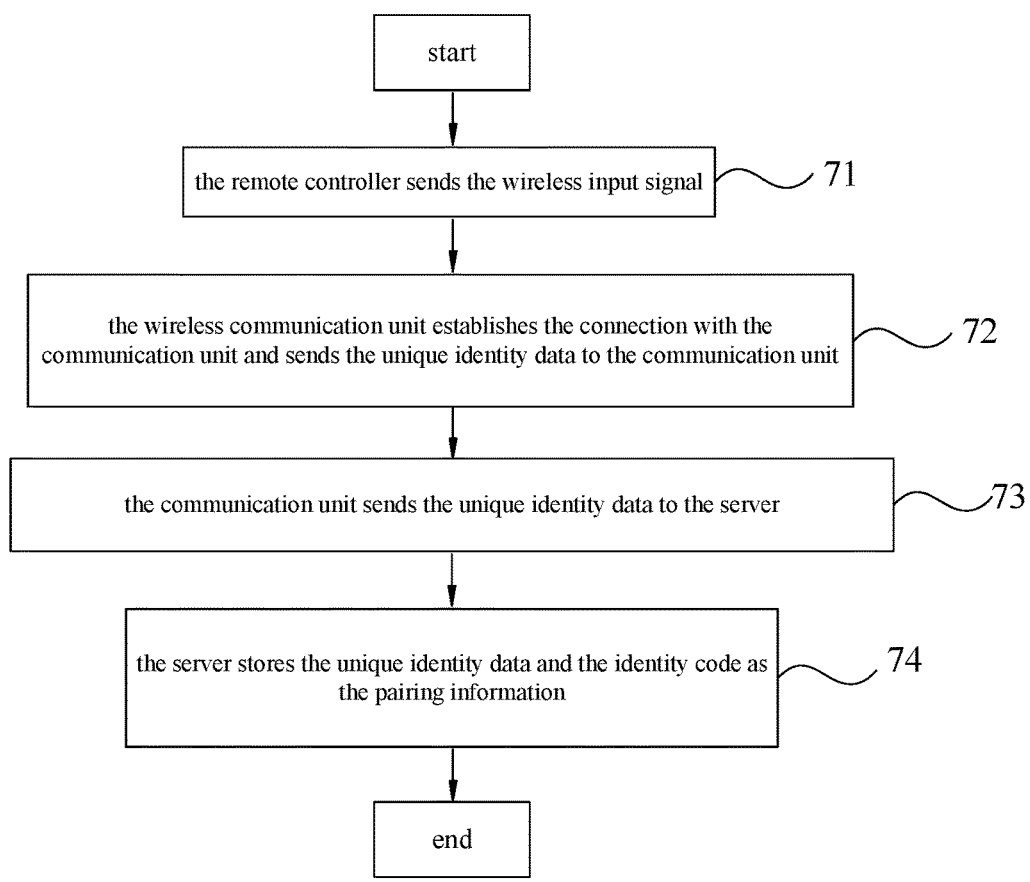
FIG. 3 shows a flow diagram of how the remote control system of the present invention executes a connection setting process.

Before using the remote control system, the user of the household appliance 3 (can also be the user of the mobile device 5) has to complete a connection setting process first. It is noteworthy that during the connection setting process, the connection setting device 2 of the present invention is operated in the setting mode. Please refer to FIG. 2 and FIG. 3; how the remote control system executes the connection setting process will be described, and the connection setting process comprises the following steps.

In the step 71, the remote controller 23 is operated by the user to send the wireless input signal, that is to say, the infrared signal.

In the step 72, the infrared receiver 211 turns the received infrared signal into the electrical signal and outputs the electrical signal to the controller 213, and the controller 213 responds to the electrical signal to control the WiFi module 212 after receiving the electrical signal from the infrared receiver 211, so that the WiFi module 212 establishes the connection with the communication unit 22, for example, using a WiFi technology and transmits the unique identity data to the communication unit 22.

In the step 73, the communication unit 22 transmits the unique identity data from the WiFi module 212 to the server 6 via the Internet 4.

It is noteworthy that the step 71-73 is operated in the setting mode of the connection setting device 2 of the present invention.

In the step 74, the server 6 receives the unique identity data from the communication unit 22 and receives, for example, an identity code uniquely corresponded to the mobile device 5 from the mobile device 5 via the Internet 4, and stores the unique identity data and the identity code as the pairing information related to the WiFi module 212 and the mobile device 5.

Figure 4:
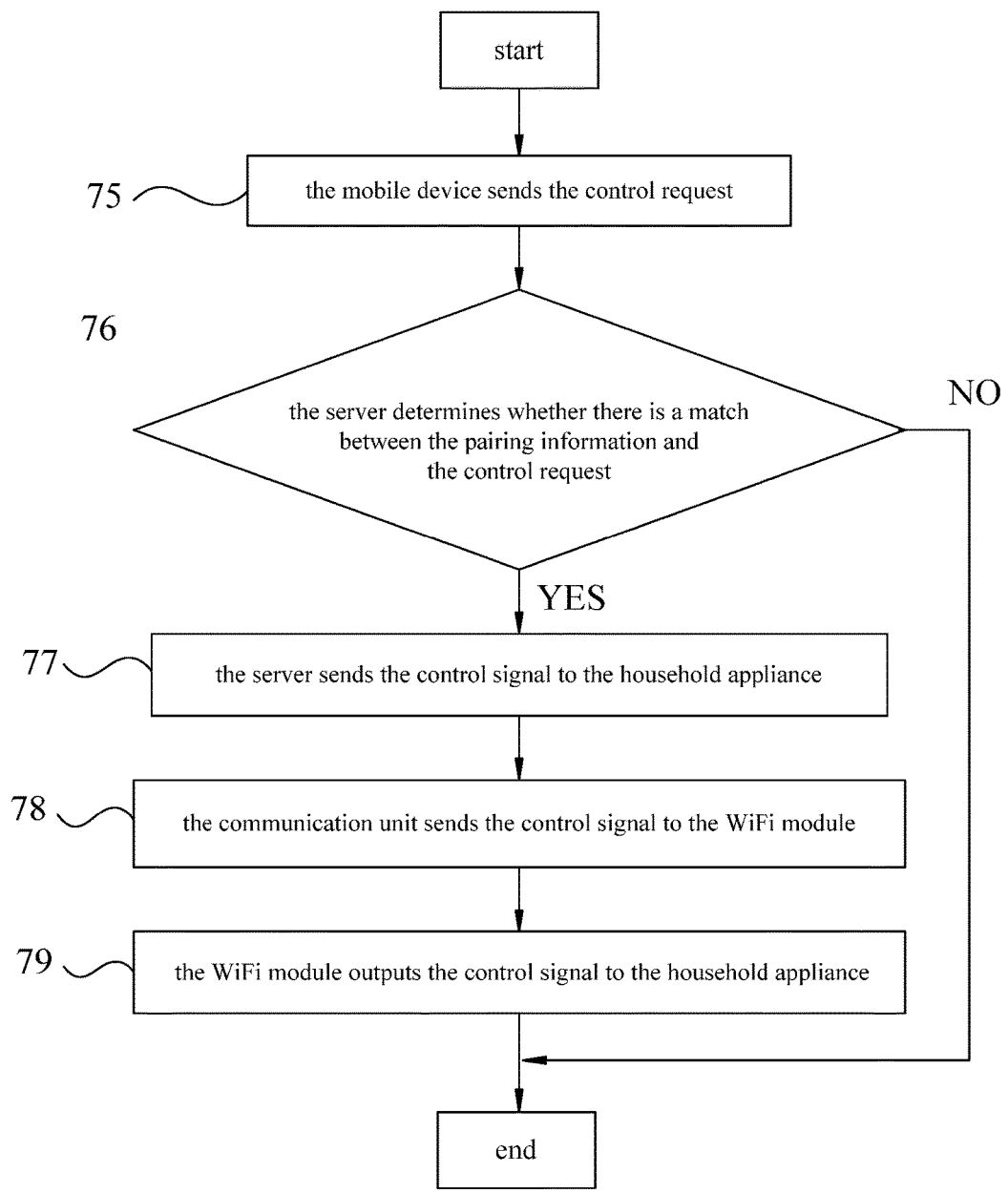
FIG. 4 shows a flow diagram of how the remote control system of the present invention executes a remote control process.

Please refer to FIG. 2 and FIG. 4; how the remote control system of the present invention executes a remote control process will be described. It is noteworthy that during the remote control process, the connection setting device 2 of the present invention is operated in the application mode. The remote control process comprises the following steps.

In the step 75, the mobile device 5 transmits a control request including a control signal and the identity code to the server 6. The control signal is corresponding to a specific operation corresponded to the WiFi module 212 of the wireless communication unit 21 and related to the household appliance.

In the step 76, when the server 6 receives the control requested from the mobile device 5, the server 6 determines if there is a match between the control request and the pairing information stored. If the result of the determination is affirmative, then execute the step 77; otherwise, end the remote control process.

In the step 77, the server 6 transmits the control signal to the communication unit 22 via the Internet 4.

In the step 78, due to the wireless connection between the communication unit 22 and the WiFi module 212, when the communication unit 22 receives the control signal from the server 6, the communication unit 22 transmits the control signal to the WiFi module 212 of the wireless communication unit 21 through a short-distance wireless communication, such as the WiFi technology.

In the step 79, the WiFi module 212 outputs the control signal to the household appliance 3. Therefore, the household appliance 3 executes the specific operation according to the control signal received from the WiFi module 212; by doing so, the mobile device 5 achieves the purpose of the remote control. It is noteworthy that the step 78 and 79 are operated in the application mode of the connection setting device 2 of the present invention.

If the mobile device 5 is a smart phone and the household appliance 3 is an air conditioner set in the house of the user, when the user who is outside wants to open the air conditioner before going home to lower the temperature in the house, the user only needs to transmit the control request to the server 6 via the Internet 4 through operating the smart phone, and after the server 6 determines that there is a match, the control signal can be transmitted to the air conditioner quickly by the communication unit 22 and the WiFi module 212. In this example, the control signal can be, but not limited to, the control signal related to the power, the temperature regulation and the air volume of the air conditioner.

In another embodiment of the present invention, the connection setting device 2 of the present invention can comprise a wireless communication unit 21 and a remote controller 23. The wireless communication unit 21 comprises an infrared receiver 211, a WiFi module 212 and a controller 213. The controller 213 is electrically connected to the infrared receiver 211 and the WiFi module 212 for receiving the electrical signal from the infrared receiver 211, and responding to the electrical signal to control the WiFi module 212, so that the WiFi module 212 transmits the unique identity data to the mobile device 5 via the Internet 4. In the application mode, the mobile device 5 transmits the control signal to the wireless communication unit 21 via the Internet 4 when the server 6 determines if there is a match between the control request including the control signal and the identity code and the stored pairing information. It is noteworthy that the communication unit 22 is not necessary because the Internet 4 can be a local area network in a building; by doing so, the object of the present invention can also be achieved without the communication unit 22 in a local area network.

In conclusion, the connection setting device 2 of the present invention, especially when operated in the setting mode, can establish the connection between the WiFi module 212 of the wireless communication unit 21 and the communication unit 22 automatically via the wireless input signal sent from the remote controller 23 and transmits the unique identity data from the wireless communication unit 21 to the server 6; by doing so, it is convenient and fast to complete the connection setting process. Therefore, compared to the prior art, the connection setting device 2 of the present invention can be operated without human input, so the conventional technology which is inputted with human errors can be avoided, and the object of the present invention can be achieved.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A connection setting system, for setting a connection between a household appliance and a mobile device connected to an Internet, wherein the connection setting system is operable in a setting mode, comprising:

a wireless communication unit, mounted and electrically connected to the household appliance and having a unique identity data;

a communication unit, connected to a server via the Internet; and a remote controller, for sending a wireless input signal;

wherein in the setting mode, the wireless communication unit responds to the wireless input signal received from the remote controller and establishes a connection with the communication unit through a short-distance wireless communication for transmitting the unique identity data to the communication unit, so that the communication unit transmits the unique identity data from the wireless communication unit to the server via the Internet, and the server stores the unique identity data from the communication unit and an identity code corresponded to the mobile device uniquely and received via the Internet as a pairing information related to the wireless communication unit and the mobile device.

2. The connection setting system of claim 1, wherein the connection setting system can be operable in a application mode, in the application mode, the communication unit is connected to the wireless communication unit for receiving a control signal of a specific operation sent from the mobile device via the Internet and transmitted via the server and corresponded to the wireless communication unit and related to the household appliance, and transmits the control signal to the wireless communication unit in the way of wireless, so that the household appliance performs the specific operation according to the control signal received by the wireless communication unit.

3. The connection setting system of claim 1, wherein the wireless input signal is an infrared signal, and the wireless communication unit comprises:
- an infrared receiver, for receiving the wireless input signal from the remote controller and turning the wireless input signal into an electrical signal;
- a WiFi module, electrically connected to the household appliance and having a generating code as the unique identity data; and
- a controller, electrically connected to the infrared receiver and the WiFi module, for receiving the electrical signal from the infrared receiver, and responding to the electrical signal to control the WiFi module, so that the WiFi module establishes the connection with the communication unit using a WiFi technology and transmits the unique identity data to the communication unit.

4. The connection setting system of claim 2, wherein in the application mode, the mobile device transmits a control request including the control signal and the identity code, and the server transmits the control signal to the communication unit via the Internet when the server determines if there is a match between the control request from the mobile device and the pairing information stored by the mobile device.

5. A connection setting method, for setting a connection between a household appliance and a mobile device connected to an Internet, implemented via a connection setting system, wherein the connection setting system comprises a wireless communication unit mounted and electrically connected to the household appliance and having a unique identity data, a communication unit connected to a server via the Internet and a remote controller, comprising the following steps:
(A) via the remote controller sending a wireless input signal;
(B) via the wireless communication unit responding to the wireless input signal received from the remote controller, establishing a connection with the communication unit through a short-distance wireless communication and transmitting the unique identity data to the communication unit; and
(C) via the communication unit transmitting the unique identity data from the wireless communication unit to the server via the Internet, and the server storing the unique identity data from the communication unit and an identity code corresponded to the mobile device uniquely and received via the Internet as a pairing information related to the wireless communication unit and the mobile device.

6. The connection setting method of claim 5, wherein the server can determine whether to transmit a control signal via the Internet via the communication unit and the wireless communication unit to the household appliance according to the stored pairing information and the control signal of specific operation from the mobile device comprising the identity code and related to the household appliance.

7. The connection setting method of claim 5, wherein in the step (A), the wireless input signal is an infrared receiver.

8. The connection setting method of claim 5, wherein in the step (B), the short-distance wireless communication is to use a WiFi technology.

9. A connection setting system, for setting a connection between a household appliance and a mobile device connected to an Internet, wherein the connection setting system is operable in a setting mode, comprising:
- a wireless communication unit, mounted and electrically connected to the household appliance and having a unique identity data; and
- a remote controller, for sending a wireless input signal;
- wherein in the setting mode, the wireless communication unit responds to the wireless input signal received from the remote controller and transmits the unique identity data to the mobile device via the Internet, and the mobile device stores the unique identity data and an identity code corresponded to the mobile device uniquely and received via the Internet as a pairing information related to the wireless communication unit and the mobile device.

10. The connection setting system of claim 9, wherein the connection setting system can be operable in a application mode, in the application mode, the mobile device sends a control signal of a specific operation corresponded to the wireless communication unit and related to the household appliance and transmits the control signal to the wireless communication unit via the Internet, so that the household appliance performs the specific operation according to the control signal received by the wireless communication unit.

11. The connection setting system of claim 9, wherein the wireless input signal is an infrared signal, and the wireless communication unit comprises:
- an infrared receiver, for receiving the wireless input signal from the remote controller and turning the wireless input signal into an electrical signal;
- a WiFi module, electrically connected to the household appliance and having a generating code as the unique identity data; and
- a controller, electrically connected to the infrared receiver and the WiFi module, for receiving the electrical signal from the infrared receiver, and responding to the electrical signal to control the WiFi module, so that the WiFi module transmits the unique identity data to the mobile device via the Internet.

12. The connection setting system of claim 10, wherein in the application mode, the mobile device transmits the control signal to the wireless communication unit via the Internet when the server determines if there is a match between the control request including the control signal and the identity code and the stored pairing information.

13. The connection setting system of claim 9 or 12, wherein the Internet can be a local area network.

* * * * *